A. C. WEBB.
GEAR SHIFTER.
APPLICATION FILED JULY 10, 1911.
1,035,503.
Patented Aug. 13, 1912.
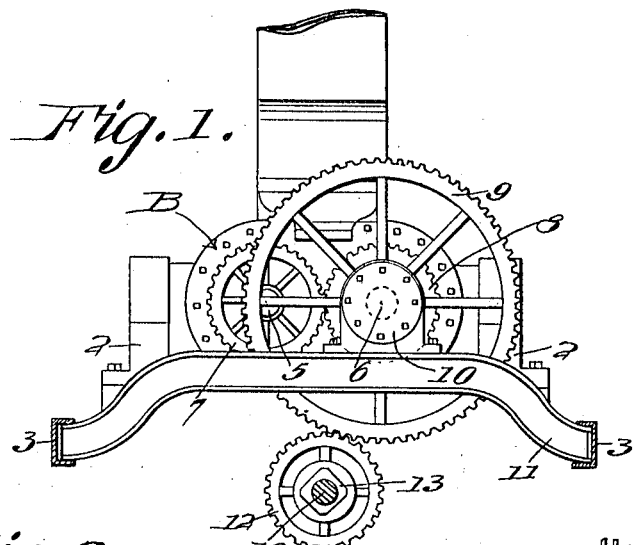
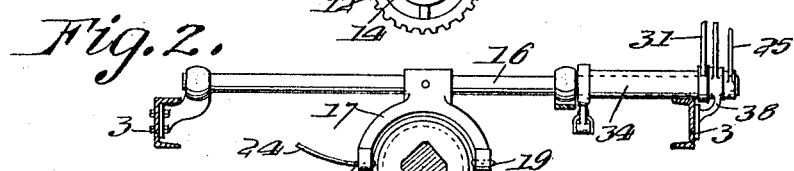
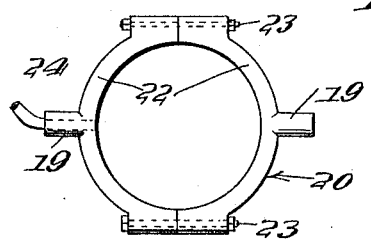
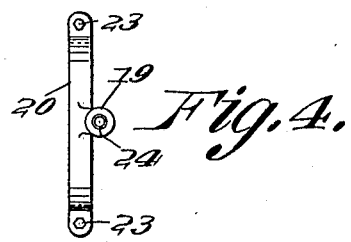
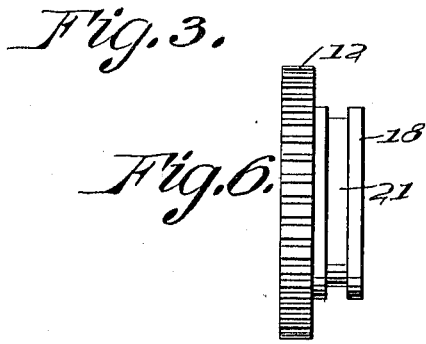
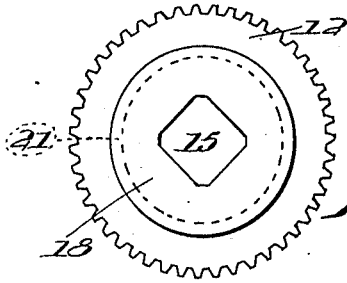
Witnesses:
Lottie M. Fox.
Bertha von Behrens.
Inventor:
Albert C. Webb,
By Hugh K. Wagner
His Attorney.

UNITED STATES PATENT OFFICE.

ALBERT C. WEBB, OF ST. LOUIS, MISSOURI, ASSIGNOR TO THE WEBB MOTOR FIRE APPARATUS COMPANY, OF ST. LOUIS, MISSOURI, A CORPORATION OF DELAWARE.

GEAR-SHIFTER.

1,035,503.  Specification of Letters Patent.  Patented Aug. 13, 1912.

Application filed July 10, 1911. Serial No. 637,744.

*To all whom it may concern:*

Be it known that I, ALBERT C. WEBB, a citizen of the United States, residing at the city of St. Louis, State of Missouri, have invented certain new and useful Improvements in Gear-Shifters, of which the following is a specification.

This invention relates to attachments for automobile fire engines, and more especially to the mechanism employed for driving the pump with which the engine is equipped.

It comprehends, generally, an improved operating mechanism of the character specified, such mechanism including a shiftable gear which is movable into and out of mesh with the main driving gear of the pump and is supported and operated in a particular manner through the intermediary of special parts.

A structural embodiment of the invention is illustrated in the accompanying drawings, whereof, Figure 1 is a transverse sectional view of an automobile with a pump supported on the chassis, in conjunction with gear driving mechanism for the pump; Fig. 2 is a similar view, showing the gear shifter; Figs. 3 and 4 are, respectively, face and side views of a collar carried by the shiftable gear; and Figs. 5 and 6 are, respectively, face and side views of the shiftable gear.

In said drawings, B represents the pump element which is to be operated and which may be of any suitable construction or make, and is here shown as of the double rotary type. Its body portion 1 is supported in vertical brackets 2 attached to the main rails 3 of the chassis of the automobile, and its two shafts 5 and 6 are provided upon their projecting front ends with intermeshing gears 7 and 8, the latter shaft constituting the driving shaft and carrying a large gear 9. This shaft extends forwardly beyond the other shaft and is journaled at its terminal in a cap-like bearing 10 mounted upon the cross-rail 11.

Gear 9 is driven in the present instance from a gear 12 which is slidably mounted upon the angular portion 13 of the clutch shaft 14 of the car, its bore or axial opening 15 having a corresponding shape, as will be understood. Said gear 12 is supported from a horizontal rock shaft 16 by means of a depending yoke 17, which is secured to that shaft and straddles the hub portion 18 of the gear, the ends of the legs of said yoke being forked and themselves straddling the laterally-offset trunnions 19 of a collar 20 seated in a circumferential groove 21 formed in said hub. Collar 20 is preferably constructed of counterpart semi-annular sections 22, whose corresponding enlarged upper and lower ends are secured together by means of bolts 23 passed through registering perforations formed therein. To prevent said collar from chafing in its groove, one of the trunnions is made hollow to receive the end of a lubricant feed pipe 24 leading from a suitable source of supply.

The actuation of the shiftable gear 12 is effected by means of a lever 25 mounted upon the end of shaft 16, the arrangement being such that movement of said lever in one direction will bring the gear into mesh with the pump drive gear 9, while reverse movement will shift said gear out of mesh, as will be apparent.

The clutch shaft 14 is adapted to be coupled with the engine shaft (not shown) through the intermediary of a clutch of any suitable type.

The operation of the mechanism is as follows: Assuming that the car is stationary and the engine is running idly, when it is desired to start the pump, the lever 25 is moved so as to rock the shaft 16 in the direction to cause the yoke 17 to shift the gear 12 on shaft 14 into mesh with gear 9, after which the clutch mechanism is operated in the usual manner to couple the shaft 14 with the engine shaft, whereby said shaft 14 rotates with the engine shaft and drives the pump shafts 5 and 6 through the medium of gears 12, 9, 8, and 7. When it is desired to stop the pump, either the clutch mechanism may be operated to uncouple the shaft 14 from the engine shaft, or the lever 25 may be shifted, so as to rock shaft 16 in the opposite direction to cause the yoke 17 to shift the gear 12 on shaft 14 out of mesh with the gear 9.

What is claimed is:

1. The combination with a shaft; of a shiftable element mounted thereon and having its hub formed with a circumferential groove; a collar fitted in said groove and provided with a pair of trunnions, one of which is hollow; a rocking yoke straddling said hub and collar and having the ends of its legs pivotally connected to said trunnions, for shifting said element along said shaft; and a lubricant supply pipe having the discharge end thereof fitted in the hollow trunnion.

2. The combination, with a shaft; of a shiftable element mounted thereon and having its hub formed with a circumferential groove; a collar fitted in said groove and provided with a pair of trunnions, one of which is hollow; a rock shaft; a yoke depending from said rock shaft and straddling said hub and collar the ends of the legs of said yoke being pivotally connected to said trunnions; means for operating said rock shaft to shift said element along the first-named shaft; and a lubricant supply pipe having the discharge end thereof fitted in the hollow trunnion.

In testimony whereof I hereunto affix my signature in the presence of two witnesses.

ALBERT C. WEBB.

Witnesses:
R. M. JAMES,
LOTTIE M. FOX.

Copies of this patent may be obtained for five cents each, by addressing the "Commissioner of Patents, Washington, D. C."